3,629,105
INHIBITING SCALE FORMATION
Walter J. Weiss, Sugar Land, Tex., assignor to
Texaco Inc., New York, N.Y.
No Drawing. Filed Oct. 11, 1968, Ser. No. 766,953
Int. Cl. C02b 5/06
U.S. Cl. 252—8.55 B
6 Claims

ABSTRACT OF THE DISCLOSURE

Inhibiting the scale forming action of water containing mineral constituents and particularly ground waters by incorporating minute concentrations of sulfonated lignite.

---

The present invention relates to scale control and more particularly to inhibiting or preventing the deposition of scale from water and particularly the so-called connate or ground waters which originate in sub-surface locations in connection with the production of oil wells or water wells, or even in the production of brines.

The deposition of the scale deposits from an aqueous liquid as referred to herein, means the precipitation, crystallization or formation on the walls of the conduits or containers of inorganic solid deposits of carbonates, sulfates or even oxides or sulfides. More commonly the deposits comprise the carbonates and sulfates and particularly the alkaline earth metal salts or even iron salts thereof. Typical salts are the calcium, barium or strontium, carbonates or sulfates or, as above indicated, iron sulfide or the oxides $Fe_2O_3$ and $Fe_3O_4$. It is the precipitation and deposit of these materials which is referred to herein as scale deposit.

The preferred aspect of the present invention concerns the handling of connate waters, which is an unavoidable and necessary incident, for example, of petroleum production, wherein the production of sub-surface petroleum is typically accompanied by handling of relatively large quantities of ground waters or brine of varying inorganic composition. The problem is also encountered in secondary recovery operations involving the injection of water to displace and assist the recovery of sub-surface petroleum.

As a result, the deposition of scale in the wells, the flow lines and the treaters appears, in varying degree, to be a general phenomenon of all systems involving the circulation of ground waters containing typical mineral constituents.

The causes of the precipitation or deposit are many and varied. Scaling may result from a pressure drop or a temperature change in the system, the intermingling of incompatible waters, microbial reaction, evolution of $CO_2$ or other gases, or even from the corrosion of the equipment. In any event, the complexity of the problem makes its analysis for preventive purposes both difficult and costly. However, where scale deposition is objectionable, control measures become necessary to avoid loss of production and fouling of equipment and even corrosion.

In accordance with the present invention it has been discovered that the deposition or formation of scale on solid surfaces, herein referred to as scaling, can be avoided by incorporating in the flowing liquid small proportions of sulfonated lignite and particularly an alkali metal salt of sulfonated lignite. The term sulfonated lignite as used herein includes also the sulfomethylated lignite and its alkali metal salts as above indicated, such as may be prepared, for example, as described in U.S. Pat. No. 3,034,982.

In general, such materials are prepared by reacting lignite, preferably a high humic acid lignite, in the presence of caustic soda, with a soluble sulfite or sulfurous acid and formaldehyde or acetone solutions at an elevated temperature. As will hereinafter more fully appear, a chromate or dichromate may also be advantageously added either before or after the reaction.

While lignite derivatives of this type have been made and used in the formulation of drilling mud their function in such systems is that of a dispersing or thinning agent, namely to effect the dispersion or suspension of clay particles in the drilling fluid, thus controlling the viscosity and stability of the drilling fluid and particularly water-based drilling fluids.

The present invention, however, insofar as its presently known, does not depend on such properties or characteristics but surprisingly, and due to functions of which I am not presently fully aware, inhibits the deposition or adherence of scale upon the adjacent surfaces. It moreover does this in extremely small proportions quite strikingly distinct from those which characterize its use in dispersing systems and particularly in aqueous drilling muds for example. More specifically it has been found that the present inhibitor is effective in concentrations below 50 p.p.m. and ordinarily below 10 to 20 p.p.m., and thus the additive is also advantageous from the economic standpoint, inasmuch as an aqueous system can be protected by extremely minute injections of the sulfonated lignite.

I am particularly concerned with the reaction product made by heating lignite in an alkaline liquid with a compound of the class consisting of sulfurous acid and the water soluble salts thereof at a temperature and for a time sufficient for the sulfur compound to react with the lignite to form alkali metal sulfonated side chains on the lignite.

Also, as has been intimated, the reaction can be carried out in the presence of approximately stoichiometric quantities of a methylene compound such as aldehyde or methyl ketone to introduce methylene or substituted methylene radicals into the sulfonate radical, as for example, the sulfomethylate group

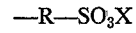
$$-R-SO_3X$$

where R represents a methylene radical and X represents an alkali metal group.

The reaction may take place at various elevated temperatures for varying times but I prefer to raise the temperature of the slurry rapidly under pressure to an end point temperature of 500° F. or less, normally in the range of 350° F. to 500° F.

The rate of heating does not appear to be as critical as the end point temperature and effective materials can be produced with heat-up times as short as a minute or two. For practical commercial reasons the heating step normally will not substantially exceed an hour, with a practical heat-up time being in the range of 3 to 10 minutes.

The following is an example of a preferred preparation involving the following ingredients:

Water—250 cc.
Caustic soda—9 gms.
Sodium sulfite (anhydrous)—38.3 gms.
40% formaldehyde solution—22.5 cc.
Drilling mud grade lignite—75 gms.
Sodium chromate (anhydrous basis)—2.5 gms.

Formulation proceeds as follows: The caustic soda is dissolved in the water and the sodium sulfite thereafter added with mixing until solution is effected. Subsequently the formaldehyde is added and mixing continued for 10–15 minutes. At this time the lignite is incorporated and mixed for 5 minutes'

The resultant slurry is then heated in a high temperature reactor to 500° end point temperature in one hour or less. The sodium chromate is added to the slurry, preferably as a concentrated aqueous solution after the slurry is reduced to ambient temperature.

For ease in handling and storing it has been found preferable to thereafter dry the mixture rather than to handle it as a slurry. Hence the slurry is either dried on a drum drier or spray drier, producing a free flowing dry powder.

As has been indicated, the sodium chromate addition may be omitted although it is found to contribute to the maintenance of the beneficial effect in operations involving rather substantial high temperatures.

It is to be noted that sodium dichromate can be substituted for the chromate of the above example, since in the alkaline environment, the dichromate undergoes reaction to the chromate and does not function as an oxidizer. In general the chromates and dichromates may be added in the form of the alkali metal or ammonium chromates or dichromates.

Obviously the invention is applicable to all systems wherein the handling and circulation of ground waters is accompanied by objectionable scale formation on surfaces in contact with the aqueous material such as an ordinary producing well or the flow lines associated therewith. It is equally applicable to collection lines and pipelines, and also, for example, to secondary recovery systems involving the circulation and injection of ground waters into sub-surface formations. The introduction of the inhibitor may be effected, of course at any convenient location in advance of the region where scaling is objectionable. Injection, for example, may take place in a producing well in a producing formation by way of the casing annulus feeding into the producing conduit. In view of the endless number of conventional systems involved, no useful purpose would be served by picturing such a system.

Apart from the specific and preferred aspect of the present invention as described above, namely its application to circulating bodies of ground waters and the like, it is contemplated that similar advantages may be realized in the problems of scaling in general, namely wherein a body of water, such as for example, boiler water in an operating steam boiler, is typically subject to the formation of scale deposits on the boiler and its associated surfaces.

For example, tannins have been used quite extensively for this purpose. In light of the results realized with scale forming ground waters it is contemplated that the present scale prevention materials should be at least equal and probably vastly superior to the tannins as respects their benefits for the treatment of boiler water treating material.

Referring now to the results of the present invention, reference is made to a series of typical experiments conducted by means of a routine scale inhibitor test. In accordance with this experimental test procedure, 420 ml. of distilled water is added to each of 3 beakers, followed by addition of 20.7 g. NaCl. Then $Na_2SO_4$ (40 ml. of 0.918 M) is added to each beaker. Of the 3 beakers, the first is the so-called check, blank or control which contains no inhibitor whatsoever and thus is expected to deposit scale at a substantial rate. To the second and third beakers are respectively added different quantities of the inhibitor under test, for example 10 p.p.m. and 20 p.p.m. respectively.

Clean stainless steel rotors are mounted such that they are warmed by internal heaters. These rotors are immersed in the above solutions after addition of $CaCl_2$ (40 ml. of 0.918 M) and allowed to rotate slowly for 24 hours at 42° C.

The resulting solution in each case is actually a supersaturated solution of gypsum (10,000 p.p.m. $CaSO_4.2H_2O$) in brine (5%), which simulates a field water.

After the experiment is terminated, the rotors are rinsed in acetone and the scale deposited thereon is removed, dried and weighed.

Experimental results are typically reported as follows:

|  | Blank, g. | Experimental inhibitor | |
|---|---|---|---|
|  |  | 10 p.p.m. | 20 p.p.m. |
| Weight of deposited $CaSO_4.2H_2O$ | 0.5 |  |  |

Referring to the tests on the sulfomethylated lignite accoding to the foregoing example, the results are as follows:

|  | Blank, g. | Experimental inhibitor | | |
|---|---|---|---|---|
|  |  | 10 p.p.m. | 20 p.p.m. | 40 p.p.m. |
| Weight of deposited $CaSO_4.2H_2O$ | 0.5 | 0.0 | 0.0 | 0.0 |

It is believed significant that comparison testing conducted on quebracho and sodium citrate, which are well known scale inhibitors, failed to show any prevention of scale deposition at 40 p.p.m. and, of course, at lower concentrations in the subject test. In short, the sulfonated lignite completely inhibits the deposition of mineral scale at 10 p.p.m. concentration whereas both quebracho and sodium citrate were ineffective at four times this concentration.

It is significant to observe that insofar as the practical benefits of the present invention are concerned it involves a scale forming inhibitor which varies somewhat widely in composition. That is to say, the present inhibitor may, with equal benefits, take the form of a water soluble salt of either a sulfonated lignite or sulfomethylated lignite. In addition, either one of these inhibitors may or may not, as desired, include a chromate or dichromate addition which, as pointed out above, has certain advantages under high temperature conditions.

Otherwise, however, it is important to note that within the range of benefits which are required under the conditions called for by the present development, and particularly in the handling of connate sources, as in the fields of petroleum and water producing, there is little to chose from as a practical matter between these various forms of the present inhibitor.

The present invention therefore is to be used in light of exemplary disclosures above, limited only by the following claims.

I claim:
1. The method of inhibiting the deposition of scale from a body of scale-forming connate water obtained from subterranean sources containing scale-forming mineral constituents of ground waters subject to conditions under which said mineral constituents objectionably tend to deposit scale upon the solid surfaces with which they are in contact which comprises incorporating in said water a small concentration less than 50 p.p.m. of a water-soluble sulfomethylated lignite.

2. The method as defined in claim 1 wherein said body of water comprises a circulating mass of water originating from subterranean sources in connection with the production of oil and water wells.

3. The method according to claim 1 wherein said inhibitor contains an alkali metal or ammonium chromate or dichromate.

4. The method according to claim 1 wherein the said sulfomethylated lignite is present in a concentration less than about 20 p.p.m.

5. The method as defined in claim 1 wherein the sulfomethylated lignite comprises an alkal metal salt of sulfomethylated lignite formed by reacting the lignite in an alkaline medium with a compound selected from the group consisting of sulfurous acid and water soluble salts thereof, and a methylenic compound selected from the group consisting of formaldehyde and methyl ketone, at an elevated temperature sufficient to form sulfomethylated lignite.

6. The method as defined in claim 5 wherein the said reaction is conducted at an end temperature of approximately 350 to 500° F.

References Cited

UNITED STATES PATENTS

| | | | |
|---|---|---|---|
| 2,206,007 | 6/1940 | Liebknecht | 252—179 X |
| 2,411,074 | 11/1946 | Winkelmann | 252—180 X |
| 3,034,982 | 5/1962 | Monroe | 252—8.5 |
| 3,352,902 | 11/1967 | Moschopedis | 252—8.5 X |
| 3,488,289 | 1/1970 | Tate | 252—180 |

HERBERT B. GUYNN, Primary Examiner

U.S. Cl. X.R.

210—58; 252—180, 181